(12) United States Patent
Vermeer et al.

(10) Patent No.: US 9,575,193 B2
(45) Date of Patent: Feb. 21, 2017

(54) METHODS AND COMPUTING SYSTEMS FOR SURVEY DATA ENHANCEMENT

(75) Inventors: Pieter Leonard Vermeer, Horsham (GB); David Fraser Halliday, Cherry Hinton (GB)

(73) Assignee: WESTERNGECO L.L.C., Houston, TX (US)

( * ) Notice: Subject to any disclaimer, the term of this patent is extended or adjusted under 35 U.S.C. 154(b) by 1109 days.

(21) Appl. No.: 13/302,770

(22) Filed: Nov. 22, 2011

(65) Prior Publication Data

US 2013/0131988 A1    May 23, 2013

(51) Int. Cl.
*G01V 1/00*      (2006.01)
*G01V 3/38*      (2006.01)

(52) U.S. Cl.
CPC .................... *G01V 1/003* (2013.01)

(58) Field of Classification Search
CPC .. G01V 1/003; G01V 2210/125; G01V 1/005; G01V 2210/66
USPC .................... 702/5; 367/38, 53, 31
See application file for complete search history.

(56) References Cited

U.S. PATENT DOCUMENTS

| | | |
|---|---|---|
| 2003/0076740 A1 | 4/2003 | Calvert |
| 2007/0195643 A1* | 8/2007 | Bakulin et al. ............. 367/38 |
| 2010/0054083 A1 | 3/2010 | Stork |
| 2010/0139927 A1 | 6/2010 | Bakulin et al. |
| 2011/0069580 A1* | 3/2011 | Stork ............................. 367/38 |
| 2012/0120767 A1* | 5/2012 | Vu et al. ...................... 367/31 |

FOREIGN PATENT DOCUMENTS

WO    2010148170    12/2010

OTHER PUBLICATIONS

Wang et al., "Interferometric interpolation of missing seismic data," Geophysics, May-Jun. 2009, vol. 74 (3): pp. s137-s145.*
International Search Report and Written Opinion of PCT Application No. PCT/US2012/065743 dated Mar. 28, 2013: pp. 1-12.
Bakulin et al., "The virtual source method: Theory and case study," Geophysics, Jul.-Aug. 2006, vol. 71(4): pp. SI139-SI150.
Cao, "Interferometric Interpolation of 3D OBS Data," SEG Houston International Exposition and Annual Meeting, 2009: pp. 3148-3152.
Edme et al., "Extracting reflectivity response from point-receiver ambient noise," SEG San Antonio Annual Meeting, 2011: pp. 1602-1607.
Forghani et al., "Underestimation of body waves and feasibility of surface-wave reconstruction by seismic interferometry," The Leading Edge, Jul. 2010: pp. 790-794.

(Continued)

*Primary Examiner* — Gregory J Toatley
*Assistant Examiner* — Yoshihisa Ishizuka
(74) *Attorney, Agent, or Firm* — Gary Gex

(57) ABSTRACT

Methods and systems are disclosed to enhance surveying techniques. In one embodiment, a virtual response is estimated that corresponds to energy propagated within a subsurface region between a virtual source and a virtual source estimation receiver, wherein the subsurface region corresponds to a survey zone including: a plurality of receivers deployed within the survey zone, a first subzone having at least one actual source, a second subzone within the first subzone; the virtual source is a first receiver disposed in the second subzone; and the virtual source estimation receiver is a second receiver.

8 Claims, 8 Drawing Sheets

(56) References Cited

OTHER PUBLICATIONS

Gherasim et al., "Wave-equation angle-based illumination weighting for optimized subsalt imaging," SEG Denver Annual Meeting, 2010: pp. 3293-3297.
Hanafy et al., "Interferometric Interpolation of 3D SSP Data," SEG Houston International Exposition and Annual Meeting, 2009: pp. 3138-3142.
Vasconcelos et al., "Interferometry by deconvolution: Part 2—Theory for elastic waves and application to drill-bit seismic imaging," Geophysics, May-Jun. 2008, vol. 73(3): pp. S129-S141.
Wang et al., "Interferometric interpolation of missing seismic data," Geophysics, May-Jun. 2009, vol. 74(3): pp. SI37- SI45.
Wapenaar, "Green's function retrieval by cross-correlation in case of one-sided illumination," Geophysical Research Letters, 2006, vol. 33: pp. L19304, 1-6.
Wapenaar et al., "Seismic interferometry by crosscorrelation and by multidimensional deconvolution: a systematic comparison," Geophysical Journal International, 2011, vol. 185: pp. 1335-1364.
Examination Report issued in AU2012340846 on Dec. 1, 2014, 2 pages.

* cited by examiner

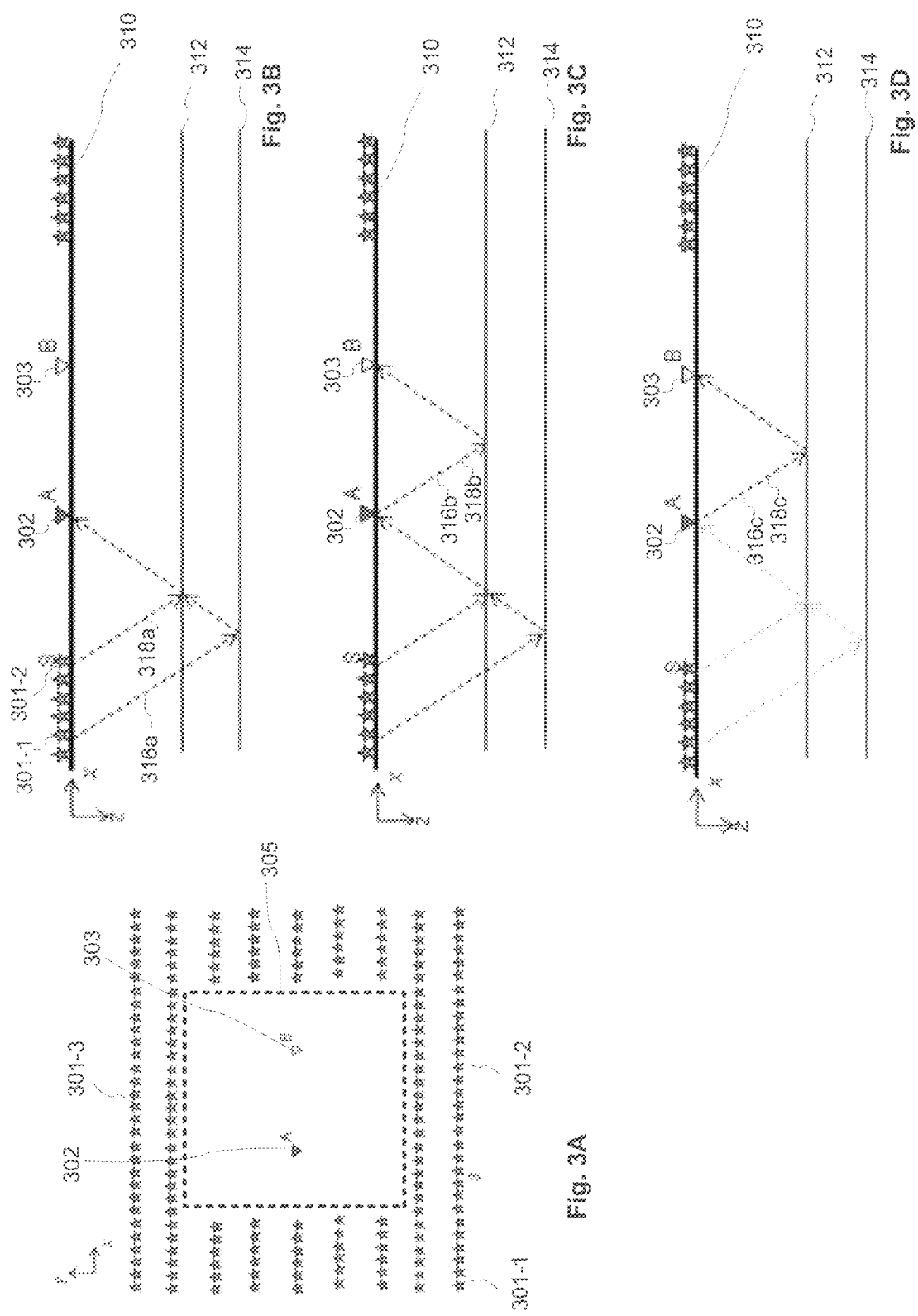

700

---

Receive data collected from a zone that corresponds to a region having a surface and a subsurface region, wherein the zone includes a plurality of receivers, the zone includes a first subzone having one or more sources, the zone includes a second subzone that is disposed within the first subzone, and the received data includes data corresponding to an activation of at least one source in the first subzone, wherein the source activation propagates an energy within the region. ⎯702

The energy propagation within the region includes one or more reflections of the energy between at least the surface and one or more subsurface horizons. ⎯704

---

Define as a virtual source a first receiver selected from the plurality of receivers, wherein the virtual source is disposed within the second subzone. ⎯706

---

Define as a virtual source estimation receiver a second receiver. ⎯708

The virtual source estimation receiver is disposed within the second subzone. ⎯710

The virtual source estimation receiver is disposed outside of the second subzone. ⎯712

Figure 7A

| Use interferometry to estimate a virtual response, wherein the virtual response corresponds to the propagation of the energy within the subsurface region between the virtual source and the virtual source estimation receiver, and the interferometry is based at least in part on the propagation of the energy within the region. | 714 |

| Measure a first transit of the energy propagation within the region, wherein the first transit is between the at least one source in the first subzone and the virtual source; measure a second transit of the energy propagation within the region, wherein the second transit is between the at least one source in the first subzone and the virtual source estimation receiver; filter the first transit with the second transit to identify one or more commonalities of the first and second transits; and derive a third transit of the energy propagation within the region, wherein: the third transit is between the virtual source and the virtual source estimation receiver, and the third transit is based at least in part on removing the one or more commonalities of the first and second transits. | 716 |

| The virtual response is based at least in part on propagation of the energy in a path within the region that includes: emission from the at least one source, a first reflection from a first subsurface horizon, a second reflection from the surface at a location substantially corresponding to the virtual source, a third reflection from at least a second subsurface horizon, and reception at the virtual source estimation receiver. | 718 |

| The first subsurface horizon is the second subsurface horizon. | 720 |

| The virtual response is based at least in part on propagation of the energy in a path within the region that includes: emission from the at least one source, a first response from the subsurface that is received at a location substantially corresponding to the virtual source, a second response from the subsurface that is received at the virtual source estimation receiver. | 722 |

| The virtual response corresponding to at least part of the energy propagation within the region includes one or more factors selected from the group consisting of body waves, surface waves, interface waves, refracted waves, and guided waves. | 724 |

| Form a virtual shot gather based at least in part on the virtual response. | 726 |

| The virtual shot gather corresponds to a border location that is within a first predefined distance of the second subzone; and identify an actual shot gather in the received data, wherein the actual shot gather corresponds to a location within a second predefined distance of the border location; and overlap the real shot gather with the virtual shot gather. | 728 |

Figure 7B

METHODS AND COMPUTING SYSTEMS FOR SURVEY DATA ENHANCEMENT

TECHNICAL FIELD

The disclosed embodiments relate generally to survey data enhancement, and more particularly, to computing systems and methods for enhancing survey data where the survey zone may include areas where sources and/or receivers might not be deployed during the survey.

BACKGROUND

A land or transition zone survey, such as a seismic survey, sometimes has to cover certain areas where access for sources is undesirable, impossible or not permitted. For example, a vibrator may not be able to cope with the topography or ground conditions (e.g., hills, dunes, wadis, sabkha, swamp), or access may be restricted for safety/security reasons (e.g., near industrial or military installations, on farms, in urban areas). In some of these cases it may still be possible or acceptable to deploy receivers in such areas. While advantageous, this still leaves a gap in the coverage at short to mid source-to-receiver offset ranges.

In some circumstances, such an "exclusion zone" or obstacle can be "undershot" from the outside. The exclusion zone could be populated with receivers, while sources can be deployed adjacent to the exclusion zone. Interferometry can then be used to construct virtual sources and/or virtual receivers, for which "virtual shot records" can be created for locations within the exclusion zone. This fills in part of the missing data, though with (virtual) sources only at the positions of the receivers (or, in some cases virtual receivers at positions of sources).

By deploying receivers at inaccessible source locations within the exclusion zone, it is possible to construct a partially virtual data set employing a source/receiver geometry as if no exclusion zone had existed.

Accordingly, there is a need for methods and systems that can employ faster, more efficient, and more accurate methods for surveys that include zones where sources and/or receivers cannot be deployed during the survey. Such methods and systems may complement or replace conventional methods and systems for surveying.

SUMMARY

The above deficiencies and other problems associated with surveys are reduced or eliminated by the disclosed methods and devices.

In accordance with some embodiments, a method is performed that includes: receiving data collected from a zone that corresponds to a region having a surface and a subsurface region, wherein: the zone includes a plurality of receivers, the zone includes a first subzone having one or more sources, the zone includes a second subzone that is disposed within the first subzone, and the received data includes data corresponding to an activation of at least one source in the first subzone, wherein the source activation propagates an energy within the region; defining as a virtual source a first receiver selected from the plurality of receivers, wherein the virtual source is disposed within the second subzone; defining as a virtual source estimation receiver a second receiver; using interferometry to estimate a virtual response, wherein: the virtual response corresponds to the propagation of the energy within the subsurface region between the virtual source and the virtual source estimation receiver, and the interferometry is based at least in part on the propagation of the energy within the region.

In accordance with some embodiments, a computing system is provided that includes at least one processor, at least one memory, and one or more programs stored in the at least one memory, wherein the one or more programs are configured to be executed by the one or more processors, the one or more programs including instructions for receiving data collected from a zone that corresponds to a region having a surface and a subsurface region, wherein: the zone includes a plurality of receivers, the zone includes a first subzone having one or more sources, the zone includes a second subzone that is disposed within the first subzone, and the received data includes data corresponding to an activation of at least one source in the first subzone, wherein the source activation propagates an energy within the region; defining as a virtual source a first receiver selected from the plurality of receivers, wherein the virtual source is disposed within the second subzone; defining as a virtual source estimation receiver a second receiver; using interferometry to estimate a virtual response, wherein: the virtual response corresponds to the propagation of the energy within the subsurface region between the virtual source and the virtual source estimation receiver, and the interferometry is based at least in part on the propagation of the energy within the region.

In accordance with some embodiments, a computer readable storage medium is provided, the medium having a set of one or more programs including instructions that when executed by a computing system cause the computing system to: receive data collected from a zone that corresponds to a region having a surface and a subsurface region, wherein: the zone includes a plurality of receivers, the zone includes a first subzone having one or more sources, the zone includes a second subzone that is disposed within the first subzone, and the received data includes data corresponding to an activation of at least one source in the first subzone, wherein the source activation propagates an energy within the region; define as a virtual source a first receiver selected from the plurality of receivers, wherein the virtual source is disposed within the second subzone; define as a virtual source estimation receiver a second receiver; use interferometry to estimate a virtual response, wherein: the virtual response corresponds to the propagation of the energy within the subsurface region between the virtual source and the virtual source estimation receiver, and the interferometry is based at least in part on the propagation of the energy within the region.

In accordance with some embodiments, a computing system is provided that includes at least one processor, at least one memory, and one or more programs stored in the at least one memory; and means for receiving data collected from a zone that corresponds to a region having a surface and a subsurface region, wherein: the zone includes a plurality of receivers, the zone includes a first subzone having one or more sources, the zone includes a second subzone that is disposed within the first subzone, and the received data includes data corresponding to an activation of at least one source in the first subzone, wherein the source activation propagates an energy within the region; means for defining as a virtual source a first receiver selected from the plurality of receivers, wherein the virtual source is disposed within the second subzone; means for defining as a virtual source estimation receiver a second receiver; means for using interferometry to estimate a virtual response, wherein: the virtual response corresponds to the propagation of the energy within the subsurface region between the virtual source and the virtual source estimation receiver, and the interferometry is based at least in part on the propagation of the energy within the region.

In accordance with some embodiments, an information processing apparatus for use in a computing system is provided, and includes means for receiving data collected from a zone that corresponds to a region having a surface and a subsurface region, wherein: the zone includes a plurality of receivers, the zone includes a first subzone having one or more sources, the zone includes a second subzone that is disposed within the first subzone, and the received data includes data corresponding to an activation of at least one source in the first subzone, wherein the source activation propagates an energy within the region; means for defining as a virtual source a first receiver selected from the plurality of receivers, wherein the virtual source is disposed within the second subzone; means for defining as a virtual source estimation receiver a second receiver; means for using interferometry to estimate a virtual response, wherein: the virtual response corresponds to the propagation of the energy within the subsurface region between the virtual source and the virtual source estimation receiver, and the interferometry is based at least in part on the propagation of the energy within the region.

In some embodiments, an aspect of the invention includes that the virtual source estimation receiver is disposed within the second subzone.

In some embodiments, an aspect of the invention includes that the virtual source estimation receiver is disposed outside of the second subzone.

In some embodiments, an aspect of the invention includes that using interferometry to estimate the virtual response further comprises: measuring a first transit of the energy propagation within the region, wherein the first transit is between the at least one source in the first subzone and the virtual source; measuring a second transit of the energy propagation within the region, wherein the second transit is between the at least one source in the first subzone and the virtual source estimation receiver; filtering the first transit with the second transit to identify one or more commonalities of the first and second transits; and deriving a third transit of the energy propagation within the region, wherein: the third transit is between the virtual source and the virtual source estimation receiver, and the third transit is based at least in part on removing the one or more commonalities of the first and second transits.

In some embodiments, an aspect of the invention includes that the energy propagation within the region includes one or more reflections of the energy between at least the surface and one or more subsurface horizons.

In some embodiments, an aspect of the invention includes that the virtual response is based at least in part on propagation of the energy in a path within the region that includes: emission from the at least one source, a first reflection from a first subsurface horizon, a second reflection from the surface at a location substantially corresponding to the virtual source, a third reflection from at least a second subsurface horizon, and reception at the virtual source estimation receiver.

In some embodiments, an aspect of the invention includes that the first subsurface horizon is the second subsurface horizon.

In some embodiments, an aspect of the invention includes that the virtual response is based at least in part on propagation of the energy in a path within the region that includes: emission from the at least one source, a first response from the subsurface that is received at a location substantially corresponding to the virtual source, and a second response from the subsurface that is received at the virtual source estimation receiver.

In some embodiments, an aspect of the invention includes that the virtual response corresponding to at least part of the energy propagation within the region includes one or more factors selected from the group consisting of body waves, surface waves, interface waves, refracted waves, and guided waves.

In some embodiments, an aspect of the invention involves forming a virtual shot gather based at least in part on the virtual response.

In some embodiments, an aspect of the invention includes that the virtual shot gather corresponds to a border location that is within a first predefined distance of the second subzone, and an additional aspect of the invention involves identifying an actual shot gather in the received data, wherein the actual shot gather corresponds to a location within a second predefined distance of the border location; and overlapping the real shot gather with the virtual shot gather.

In accordance with some embodiments, a survey system is provided for use at a survey zone that includes a region having a surface and a subsurface region, a first subzone within the survey zone, and a second subzone that is disposed within the first subzone. The survey system includes one or more sources disposed in the first subzone; a plurality of receivers disposed in the survey zone, wherein: a first receiver in the plurality of receivers is adapted to be designated a virtual source, wherein the first receiver is disposed in the second subzone; and a second receiver in the plurality of receivers is adapted to be designated a virtual source estimation receiver.

In some embodiments of the survey system, the one or more sources are disposed on the surface of the region.

In some embodiments of the survey system, the plurality of receivers are disposed on the surface of the region.

In some embodiments of the survey system, the sources and receivers are configured to generate and receive seismic energy, respectively.

In some embodiments of the survey system, the second subzone is an exclusion zone.

In some embodiments of the survey system, the survey system is adapted to be reconfigurable during a survey operation by deploying another receiver within the survey zone.

In some embodiments of the survey system, the survey system is adapted to be reconfigurable during a survey operation by deploying another source within the first subzone.

In some embodiments of the survey system, the virtual source estimation receiver is disposed in the second subzone.

In accordance with some embodiments, a method is performed that includes: placing a source in a first subzone of a survey zone; placing a plurality of receivers in the survey zone, wherein: at least one receiver in the plurality of receivers is in a second subzone of the survey zone, and the second subzone is within the first subzone; activating the source to propagate energy within a subsurface region of the survey zone; identifying a first receiver in the plurality of receivers as a virtual source, wherein the first receiver is in the second subzone; identifying a second receiver in the plurality of receivers as a virtual source estimation receiver; and estimating a virtual response, wherein the virtual response corresponds to the propagation of the energy within the subsurface region between the virtual source and the virtual source estimation receiver.

In accordance with some embodiments, a computing system is provided that includes at least one processor, at least one memory, and one or more programs stored in the at least one memory, wherein the one or more programs are configured to be executed by the one or more processors, the one or more programs including instructions for placing a source in a first subzone of a survey zone; placing a plurality of receivers in the survey zone, wherein: at least one receiver in the plurality of receivers is in a second subzone of the survey zone, and the second subzone is within the first subzone; activating the source to propagate energy within a subsurface region of the survey zone; identifying a first receiver in the plurality of receivers as a virtual source, wherein the first receiver is in the second subzone; identifying a second receiver in the plurality of receivers as a virtual source estimation receiver; and estimating a virtual response, wherein the virtual response corresponds to the propagation of the energy within the subsurface region between the virtual source and the virtual source estimation receiver.

In accordance with some embodiments, a computer readable storage medium is provided, the medium having a set of one or more programs including instructions that when executed by a computing system cause the computing system to: place a source in a first subzone of a survey zone; placing a plurality of receivers in the survey zone, wherein: at least one receiver in the plurality of receivers is in a second subzone of the survey zone, and the second subzone is within the first subzone; activate the source to propagate energy within a subsurface region of the survey zone; identifying a first receiver in the plurality of receivers as a virtual source, wherein the first receiver is in the second subzone; identify a second receiver in the plurality of receivers as a virtual source estimation receiver; and estimate a virtual response, wherein the virtual response corresponds to the propagation of the energy within the subsurface region between the virtual source and the virtual source estimation receiver.

In accordance with some embodiments, a computing system is provided that includes at least one processor, at least one memory, and one or more programs stored in the at least one memory; and means for placing a source in a first subzone of a survey zone; means for placing a plurality of receivers in the survey zone, wherein: at least one receiver in the plurality of receivers is in a second subzone of the survey zone, and the second subzone is within the first subzone; means for activating the source to propagate energy within a subsurface region of the survey zone; means for identifying a first receiver in the plurality of receivers as a virtual source, wherein the first receiver is in the second subzone; means for identifying a second receiver in the plurality of receivers as a virtual source estimation receiver; and means for estimating a virtual response, wherein the virtual response corresponds to the propagation of the energy within the subsurface region between the virtual source and the virtual source estimation receiver.

In accordance with some embodiments, an information processing apparatus for use in a computing system is provided, and includes means for placing a source in a first subzone of a survey zone; means for placing a plurality of receivers in the survey zone, wherein: at least one receiver in the plurality of receivers is in a second subzone of the survey zone, and the second subzone is within the first subzone; means for activating the source to propagate energy within a subsurface region of the survey zone; means for identifying a first receiver in the plurality of receivers as a virtual source, wherein the first receiver is in the second subzone; means for identifying a second receiver in the plurality of receivers as a virtual source estimation receiver; and means for estimating a virtual response, wherein the virtual response corresponds to the propagation of the energy within the subsurface region between the virtual source and the virtual source estimation receiver.

In some embodiments, an aspect of the invention includes that the virtual response is based at least in part on propagation of the energy in a path within the subsurface region that includes: emission from the source, a first response from the subsurface region that is received at a location substantially corresponding to the virtual source, and a second response from the subsurface region that is received at the virtual source estimation receiver.

In some embodiments, an aspect of the invention includes that estimating the virtual response is based at least in part on using interferometry on the first response and the second response.

In accordance with some embodiments, a method is performed that includes estimating a virtual response that corresponds to energy propagated within a subsurface region between a virtual source and a virtual source estimation receiver, wherein: the subsurface region corresponds to a survey zone including: a plurality of receivers deployed within the survey zone, a first subzone having at least one actual source, a second subzone within the first subzone; the virtual source is a first receiver disposed in the second subzone; and the virtual source estimation receiver is a second receiver.

In accordance with some embodiments, a computing system is provided that comprises at least one processor; at least one memory; and one or more programs stored in the at least one memory, wherein the one or more programs are configured to be executed by the one or more processors, the one or more programs including instructions for: receiving collected data from a survey; processing at least a part of the collected data by estimating a virtual response that corresponds to energy propagated within a subsurface region between a virtual source and a virtual source estimation receiver, wherein: the subsurface region corresponds to a survey zone including: a plurality of receivers deployed within the survey zone, a first subzone having at least one actual source, a second subzone within the first subzone; the virtual source is a first receiver disposed in the second subzone; and the virtual source estimation receiver is a second receiver.

In accordance with some embodiments, a computer readable storage medium is provided, the medium having a set of one or more programs including instructions that when executed by a computing system cause the computing system to estimate a virtual response that corresponds to energy propagated within a subsurface region between a virtual source and a virtual source estimation receiver, wherein: the subsurface region corresponds to a survey zone including: a plurality of receivers deployed within the survey zone, a first subzone having at least one actual source, a second subzone within the first subzone; the virtual source is a first receiver disposed in the second subzone; and the virtual source estimation receiver is a second receiver.

In accordance with some embodiments, a computing system is provided that includes at least one processor, at least one memory, and one or more programs stored in the at least one memory; and means for receiving collected data from a survey; means for processing at least a part of the collected data by estimating a virtual response that corresponds to energy propagated within a subsurface region between a virtual source and a virtual source estimation receiver, wherein: the subsurface region corresponds to a survey zone including: a plurality of receivers deployed within the survey zone, a first subzone having at least one actual source, a second subzone within the first subzone; the virtual source is a first receiver disposed in the second subzone; and the virtual source estimation receiver is a second receiver.

In accordance with some embodiments, an information processing apparatus for use in a computing system is provided, and includes means for: receiving collected data from a survey; means for processing at least a part of the collected data by estimating a virtual response that corresponds to energy propagated within a subsurface region between a virtual source and a virtual source estimation receiver, wherein: the subsurface region corresponds to a survey zone including: a plurality of receivers deployed within the survey zone, a first subzone having at least one actual source, a second subzone within the first subzone; the virtual source is a first receiver disposed in the second subzone; and the virtual source estimation receiver is a second receiver.

In some embodiments, an aspect of the invention includes that the second subzone is a source exclusion zone.

In some embodiments, an aspect of the invention includes that estimating the virtual response is based at least in part on using interferometry on a response from the subsurface region received at the virtual source estimation receiver.

Thus, the systems and methods disclosed herein are faster, more efficient methods for surveys that include zones where sources and/or receivers cannot be deployed during the survey. These systems and methods increase survey effectiveness, efficiency, and accuracy. Such methods and systems may complement or replace conventional methods for surveys.

BRIEF DESCRIPTION OF THE DRAWINGS

For a better understanding of the aforementioned embodiments as well as additional embodiments thereof, reference should be made to the Description of Embodiments below, in conjunction with the following drawings in which like reference numerals refer to corresponding parts throughout the figures.

FIGS. 3A-3D illustrate an example configuration for seismic interferometry in accordance with some embodiments.

FIGS. 7A-8 are flow diagrams illustrating processing methods in accordance with some embodiments.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Computing Systems

Figure 1:
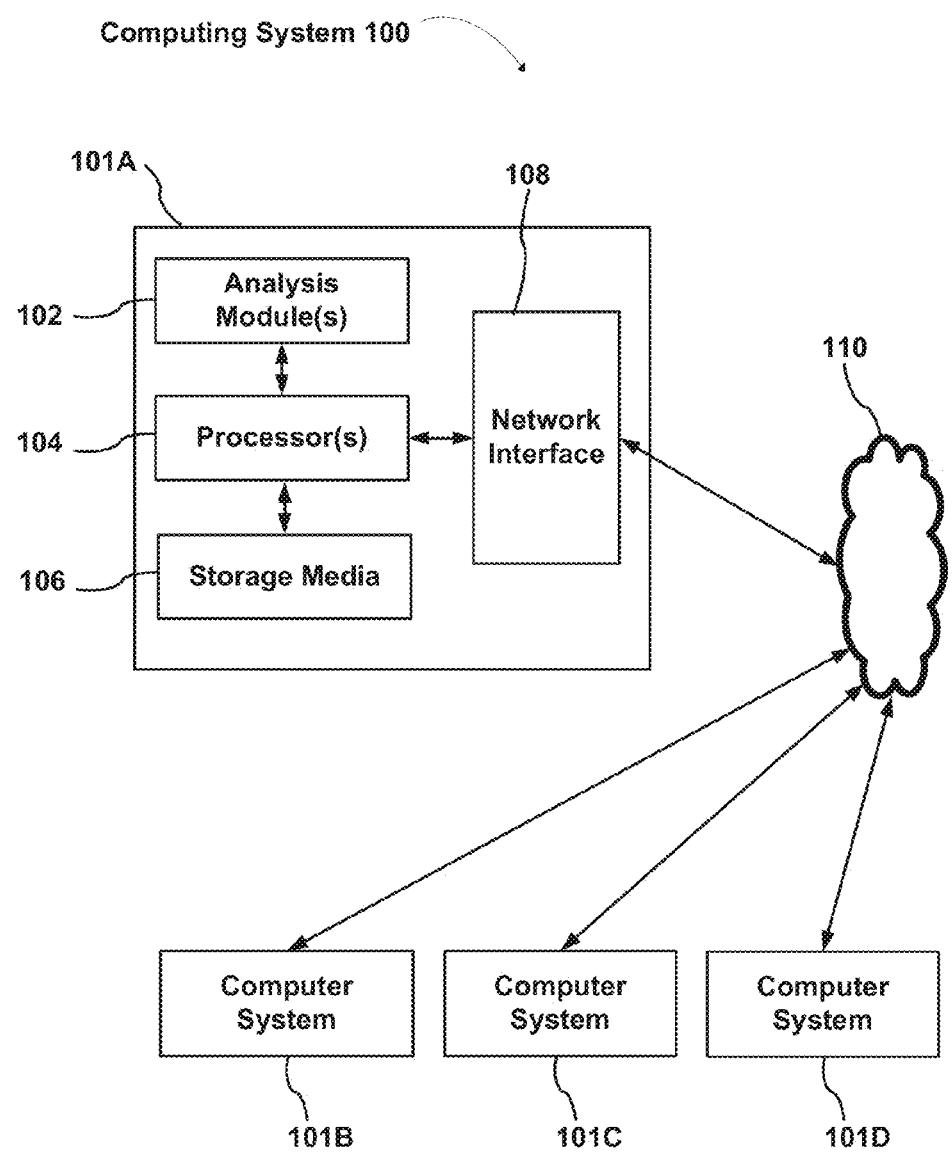
FIG. 1 illustrates a computing system in accordance with some embodiments.

FIG. 1 depicts an example computing system 100 in accordance with some embodiments. The computing system 100 can be an individual computer system 101A or an arrangement of distributed computer systems. The computer system 101A includes one or more analysis modules 102 that are configured to perform various tasks according to some embodiments, such as one or more steps of the tasks depicted in FIGS. 7 and 8. To perform these various tasks, analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the exemplary embodiment of FIG. 1 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the exemplary embodiment of FIG. 1, and/or computing system 100 may have a different configuration or arrangement of the components depicted in FIG. 1. The various components shown in FIG. 1 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Attention is now directed to an example of an equation that can be used to construct, calculate, estimate, or derive virtual responses in the workflows discussed here.

In some embodiments, a virtual source can be constructed, calculated, estimated, and/or derived from equation 1, which can be expressed as:

$$G(x_A, x_B, \omega) = \Sigma_{x \in S} G(x_B, x, \omega) G^*(x_A, x, \omega) \quad (1)$$

where $G(x_B, x, \omega)$ is the response between a source at x and a receiver at $x_B$ for frequency $\omega$, and * denotes complex conjugation (equivalent to time-reversal in the time domain). Equation (1) is one example of how a virtual source can be constructed, and is not the only form of seismic interferometry that may be successfully used with the techniques disclosed herein.

Indeed, as those with skill in the art will appreciate, in some embodiments, interferometry can be applied in other ways, for example using single trace deconvolution or multi-dimensional deconvolution.

Figure 2B:
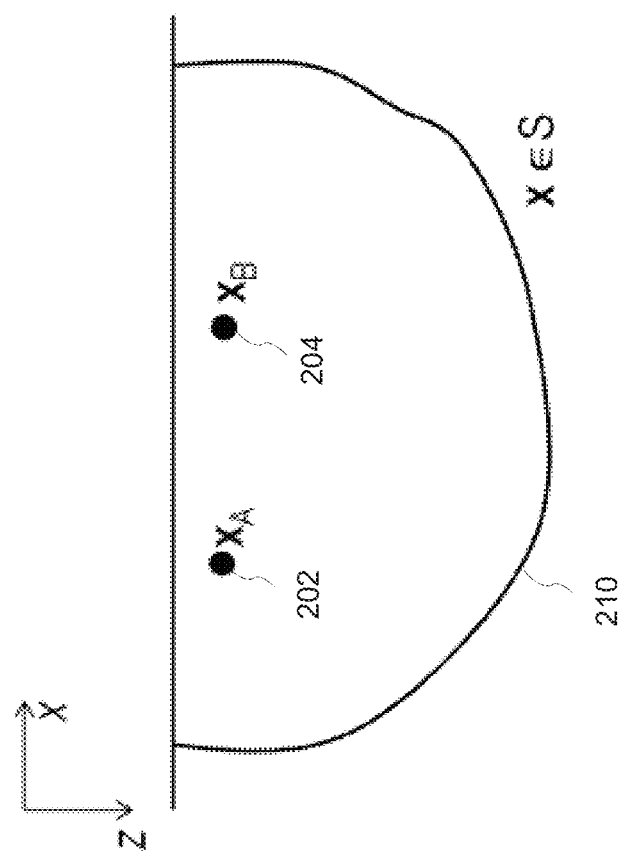
FIG. 2 illustrates an example configuration for seismic interferometry.
Figure 2A:
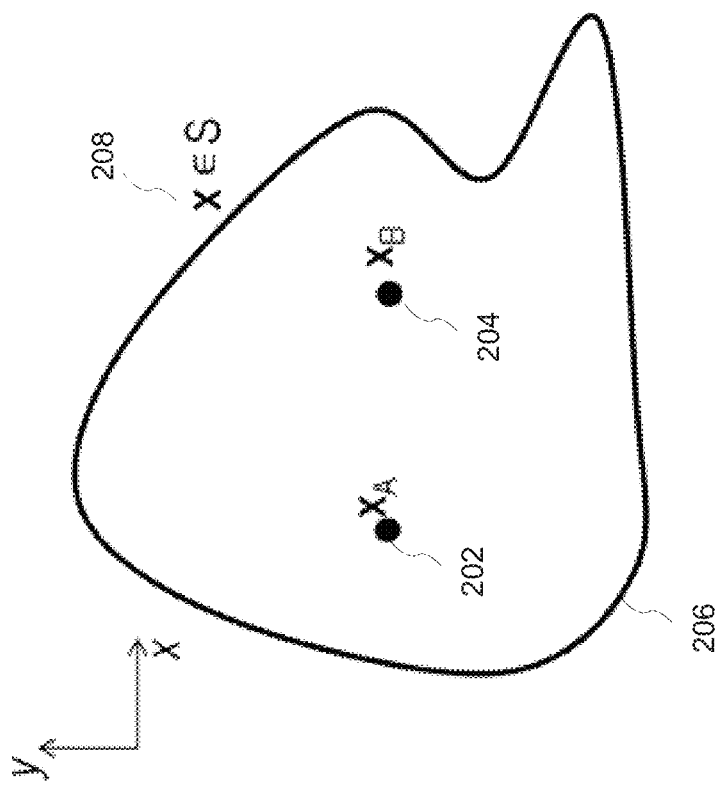

Seismic interferometry is a method that allows the response between two receiver locations to be estimated as if one of those receivers had been replaced by a source. Thus, seismic interferometry creates so-called "virtual sources." Theoretically, this requires the two receiver locations to be surrounded by a number of sources forming an arbitrarily shaped enclosing boundary. FIG. 2 illustrates such scenario where two recording locations $X_A$ and $X_B$ (202 and 204, respectively) are located within a surface S (206) which is populated by source positions x 208. FIG. 2A illustrates a horizontal cross-section, and FIG. 2B illustrates a vertical cross section. The free surface in FIG. 2B is source free in this particular example.

In some embodiments of the techniques disclosed herein, sources and receivers are placed substantially at the surface of the Earth without a totally enclosing boundary 210 as depicted in FIG. 2. Wapenaar (2006) has previously shown that it is still possible to recover the reflection response of the Earth using only sources at the surface. This will be the case provided there is enough multiple scattering in the subsurface to act as secondary sources in place of the subsurface part of the boundary illustrated in FIG. 2b. Thus, with an appropriate distribution of sources, one can recover virtual sources using sources and receivers at the surface of the Earth only. In other embodiments, one may recover virtual sources using sources and receivers deployed in a combination of the locations including the surface of the Earth and subterranean regions, e.g., within a borehole.

Attention is now directed to FIG. 3A, which is an example of one such configuration. Stars, e.g., 301-1, 301-2, 301-3, etc., indicate surface source positions, triangle A indicates the virtual source 302 and triangle B illustrates another receiver that the virtual source response will be estimated at, i.e., virtual source estimation receiver 303. While in this example, the receiver locations (i.e., virtual source 302 and virtual source estimation receiver 303) are enclosed by sources at the surface within exclusion zone 305, this is not the case in the subsurface.

FIGS. 3B through 3D illustrate how multiple reflections can account for the missing subsurface sources. These figures show a sketch of the x-z plane through the centre of FIG. 3A. The thicker horizontal line indicates free surface 310, and the two thinner horizontal lines 312 and 314 indicate features below free surface 310 (e.g., including, but without limitation, horizons, subsurface reflectors, subsurface regions creating refraction effects, and features creating body waves, surface waves, interface waves, refracted waves, and guided waves). Generally speaking, seismic interferometry works by a process of constructive interference of raypaths associated with arrivals between receiver locations, and destructive interference of those that are not associated with arrivals between the receiver locations. For purposes of illustration, in these figures only examples of raypaths that will contribute constructively are considered, but those with skill in the art will appreciate that destructive interference may be applied with equal success to the techniques disclosed herein.

FIG. 3B illustrates two raypaths 316a and 318a from sources 301-1 and 301-2, respectively that arrive as a response from the subsurface at receiver 302 (i.e., virtual source 302) with the same horizontal slowness after having interacted with subsurface features 312 and 314 (e.g., having reflected off of horizons in the subsurface).

FIG. 3C illustrates that raypaths 316*b* and 318*b*, having been reflected by free surface 310 substantially at virtual source 302, propagate back into the subsurface, interact with feature 312, and propagate back up to virtual source estimation receiver 303.

FIG. 3D illustrates that the raypaths 316*c* and 318*c* are cross-correlated as input to equation 1, the common part of the raypaths are removed (i.e., raypaths 316*a* and 318*a*). This leaves the part of raypaths (i.e., 316*c* and 318*c*) that has propagated between virtual source 302 and virtual source estimation receiver 303. In this way, provided that appropriate multiple reflections are present in the data, the reflection response between two surface receivers can be estimated by applying seismic interferometry with only surface sources.

In some embodiments, a computing system can be used to perform interferometry on data collected during a survey, such as the result graphically depicted in FIG. 3D. A computing system, such as that of FIG. 1 discussed above, comprises at least one processor; at least one memory; and one or more programs for performing interferometry on survey data that is stored in the at least one memory, wherein the one or more programs are configured to be executed by the one or more processors, the one or more programs including instructions for: receiving collected data from a survey; processing at least a part of the collected data by estimating a virtual response that corresponds to energy propagated within a subsurface region between a virtual source and a virtual source estimation receiver, wherein: the subsurface region corresponds to a survey zone including: a plurality of receivers deployed within the survey zone, a first subzone having at least one actual source, a second subzone within the first subzone; the virtual source is a first receiver disposed in the second subzone; and the virtual source estimation receiver is a second receiver. In some embodiments, the second subzone is a source exclusion zone. Moreover, in some embodiments, estimating the virtual response is based at least in part on using interferometry on a response from the subsurface region received at the virtual source estimation receiver.

The techniques of estimating, calculating and deriving a virtual response may, in some embodiments, use one or more mathematical operations such as equation 1, though those with skill in the art will recognize that any suitable technique can be used for the interferometry. Moreover, in some embodiments, surface waves and other types of coherent noise are attenuated from the data before performing interferometry.

Figure 4:
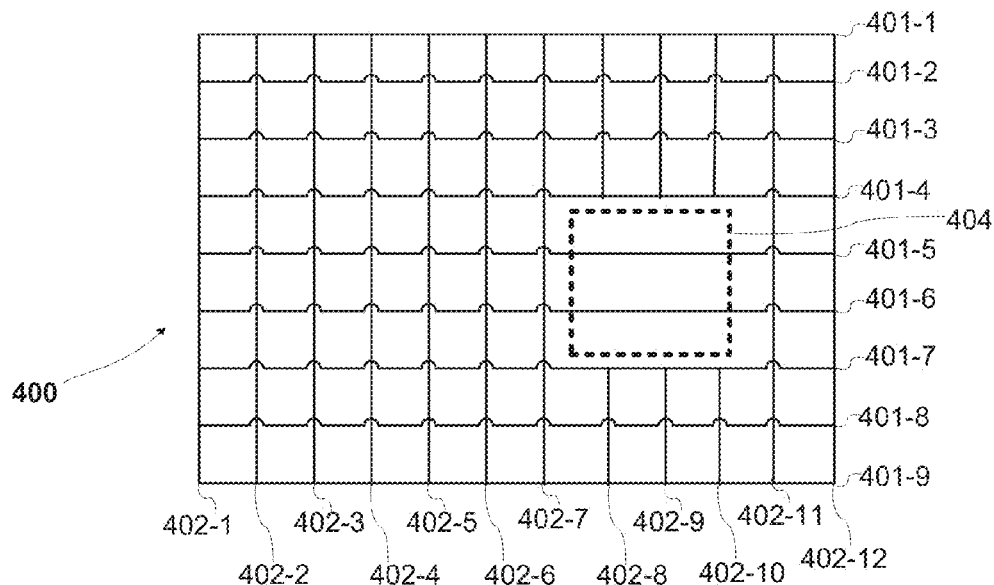
FIGS. 4-6B illustrate example survey configurations for seismic interferometry in accordance with some embodiments.

Attention is now directed to various survey geometries in accordance with some embodiments. Those with skill in the art will appreciate that by applying the theoretical framework outlined herein, and building on the example geometry depicted in FIGS. 3A-3D, various survey geometry embodiments are possible. For example, FIG. 4 illustrates an acquisition geometry 400 with receiver lines 401-1 through 401-9 (horizontal lines in the example figure) and source lines 402-1 through 402-12 (vertical lines in the example figure). In this example, one or more receivers may be placed along the receiver lines 401, and one or more sources may be placed along the source lines 402. The dashed box demarks exclusion zone 404, where in this example, sources may not be placed and as such, source lines 402-8, 402-9, and 402-10 are interrupted. Receivers within the exclusion zone, e.g., along the extent of receiver lines 401-5 and 401-6 within exclusion zone 404, can be configured as virtual sources according to the techniques disclosed herein.

Figure 5:
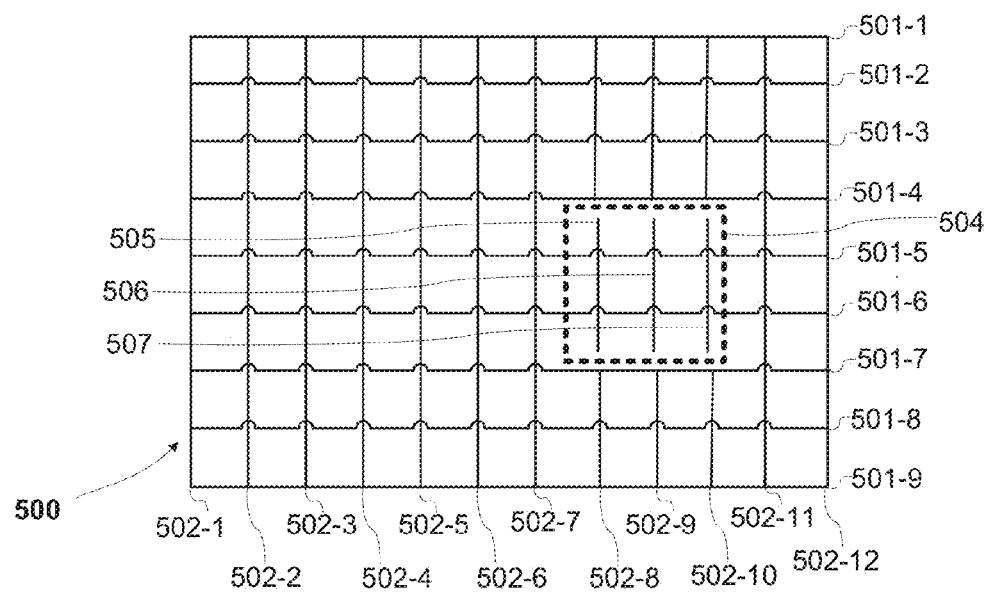

FIG. 5 illustrates a variation of FIG. 4 where within exclusion zone 504 segments of the (interrupted) source lines 502-8, 502-9, and 502-10 have been replaced by segments of receiver lines 505, 506, and 507, respectively. Receiver lines 505, 506, and 507 include receivers that can be configured as virtual sources according to the techniques disclosed herein so that a collected data set from the survey has a source/receiver geometry as if no exclusion zone had existed.

Figure 6A:
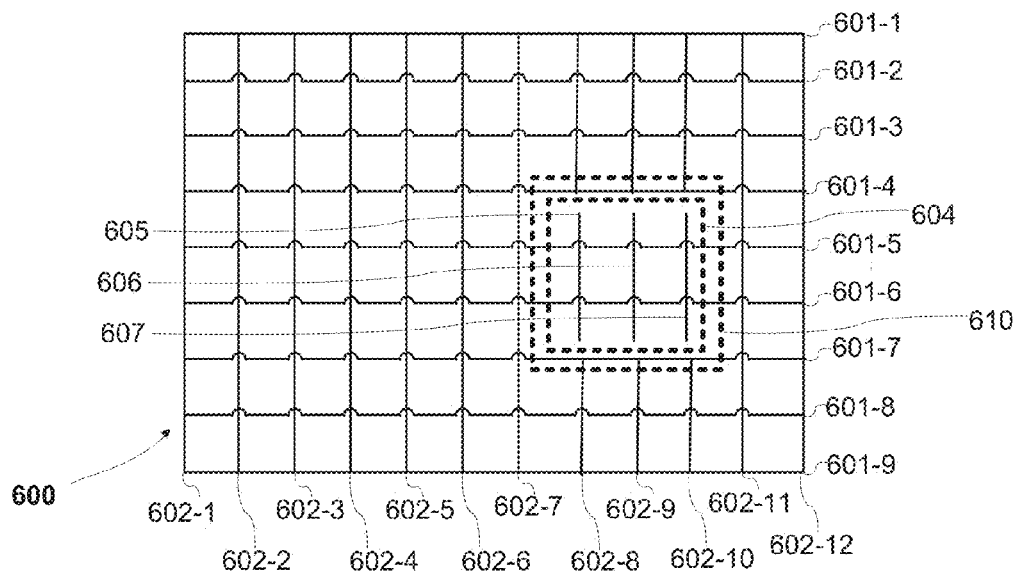

FIG. 6A illustrates a variation of FIG. 5 where additional source locations and/or lines 610 are added in one or more locations near exclusion zone 604, so as to enhance the virtual source method. In the example of FIG. 6A, additional source lines 610 are shown as a complete ring around exclusion zone 604, though those with skill in the art will appreciate that adding one or more additional sources at any given location in the vicinity of the exclusion zone can enhance the virtual source method. For example, one may add a single additional source near the intersection of source line 602-11 and receiver line 601-6; or one may add a plurality of additional sources near the intersection of source line 602-11 and receiver line 601-6, as well as a plurality of additional sources near the intersection of source line 602-9 and receiver line 601-4.

Figure 6B:
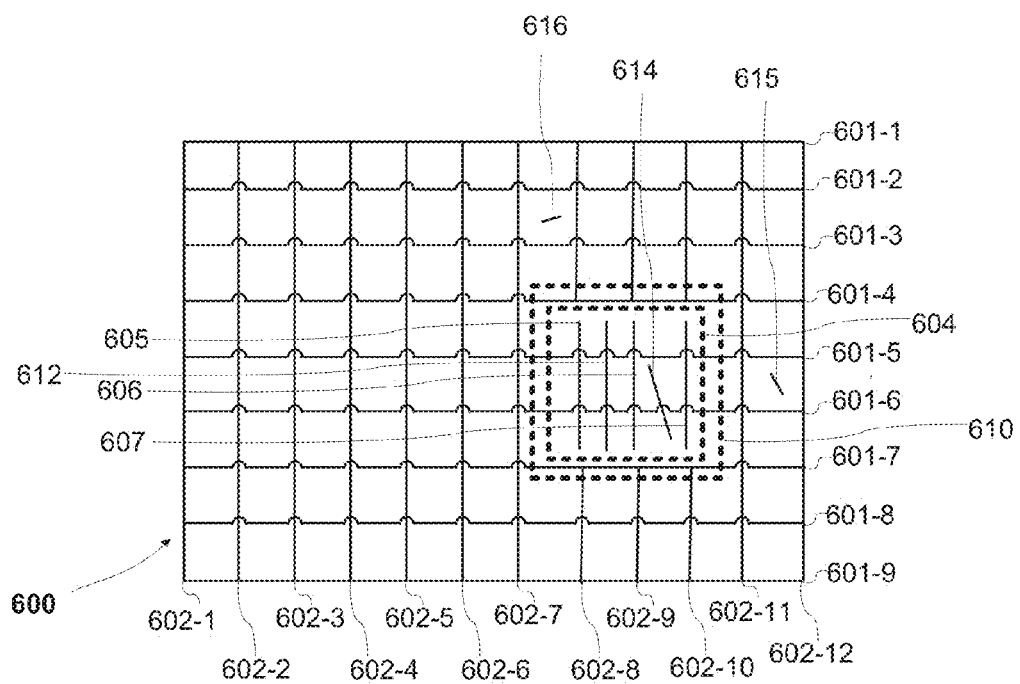

FIG. 6B illustrates a variation of FIG. 6A where additional receiver locations and/or lines 612 and 614 are placed within exclusion zone 604, so as to enhance the virtual source method. As with FIG. 6A, additional source lines 610 are shown as a complete ring around exclusion zone 604, though those with skill in the art will appreciate that adding one or more additional receiver at any given location in the exclusion zone can enhance the virtual source method. Moreover, while FIGS. 4-6A illustrate an idealized grid layout at substantially right angles, those with skill in the art will appreciate that, as illustrated in FIG. 6B, variations of grid layouts may be applicable depending on the survey needs and/or geographic requirements (e.g., additional receiver line 614 is placed at an angle between lines 602-9 and 602-10, while additional receiver line 612 is placed substantially parallel with lines 602-8 and 602-9). Further, additional receivers 615 may be placed outside exclusion zone 614 during the course of a survey, in any desirable configuration, so as to enhance the virtual source method. Finally, additional sources 616 may be placed outside exclusion zone 614 during the course of a survey, in any desirable configuration, so as to enhance the virtual source method.

Thus, according to the techniques and survey system geometries discussed above, some embodiments provide a survey system for use at a survey zone that includes a region having a surface and a subsurface region, a first subzone within the survey zone, and a second subzone that is disposed within the first subzone. In the survey system one or more sources are disposed in the first subzone, and a plurality of receivers are disposed in the survey zone, wherein: a first receiver in the plurality of receivers is adapted to be designated a virtual source, wherein the first receiver is disposed in the second subzone; and a second receiver in the plurality of receivers is adapted to be designated a virtual source estimation receiver.

In some embodiments, the survey system includes one or more sources that are disposed on the surface of the region. In some embodiments, the survey system's plurality of receivers is disposed on the surface of the region. In some embodiments, the survey system's sources and receivers are configured to generate and receive seismic energy, respectively.

In some embodiments, the survey system is adapted to be reconfigurable during a survey operation by deploying another receiver within the survey zone. In some embodiments, the survey system is adapted to be reconfigurable during a survey operation by deploying another source within the first subzone.

In some embodiments, the virtual source estimation receiver is disposed in the second subzone. In some embodiments, the survey system's second subzone is an exclusion zone, and no sources are deployed within the exclusion zone.

Attention is now directed to FIGS. 7A-7B, which are flow diagrams illustrating a method 700 in accordance with some embodiments. Some operations in method 700 may be combined and/or the order of some operations may be changed. Additionally, operations in method 700 may be combined with aspects of method 800 discussed below, and/or the order of some operations in method 700 may be changed to account for incorporation of aspects of method 800.

The method 700 is performed at a computing device (e.g., computing system 100, FIG. 1).

The method 700 includes receiving (702) data collected from a zone that corresponds to a region having a surface and a subsurface region, wherein the zone includes a plurality of receivers deployed within the zone, the zone includes a first subzone having one or more sources deployed within the first subzone, the zone includes a second subzone that is disposed within the first subzone (e.g., the second subzone is an exclusion zone without sources, and second subzone is within the first subzone that includes the one or more sources), and the received data includes data corresponding to an activation of at least one source in the first subzone, wherein the source activation propagates an energy within the region (e.g., data collected during a survey at a zone as illustrated in FIG. 3A that includes a first subzone including sources 301-1 and 301-2, and exclusion zone 305, which is a second subzone within the subzone including sources 301-1 and 301-2; activation of sources 301-1 and 301-2 as illustrated in FIG. 3B, which propagates energy as illustrated by raypaths 316a and 318a from sources 301-1 and 301-2).

In some embodiments, the energy propagation within the region includes one or more reflections of the energy between at least the surface and one or more subsurface horizons (704) (e.g., raypaths 316a and 318a from sources 301-1 and 301-2 interact with subsurface features 312 and 314 in FIG. 3B). In some embodiments, the energy propagation within the region includes a reflection of the energy between at least the surface and a subsurface horizon.

The method 700 also includes defining (706) as a virtual source a first receiver selected from the plurality of receivers, wherein the virtual source is disposed within the second subzone (e.g., receiver location 302 is designated virtual source 302 and is within exclusion zone 305 in FIGS. 3A-3D). In some embodiments, a plurality of respective receivers may be configured as a plurality of respective virtual sources.

The method 700 also includes defining (708) as a virtual source estimation receiver a second receiver (e.g., receiver location 303 is designated virtual source estimation receiver 303 and is within exclusion zone 305 in FIGS. 3A-3D). In some embodiments, a plurality of respective receivers may be configured as a plurality of respective virtual source estimation receivers.

In some embodiments, the virtual source estimation receiver is disposed within the second subzone (710) (e.g., receiver location 303 is designated virtual source estimation receiver 303 and is within exclusion zone 305 in FIGS. 3A-3D).

In some embodiments, the virtual source estimation receiver is disposed outside of the second subzone (712) (e.g., receiver line 615 includes one or more receivers that can be designed a virtual source estimation receiver and is outside exclusion zone 604 in FIG. 6B).

The method 700 also includes using interferometry (714) to estimate a virtual response, wherein the virtual response corresponds to the propagation of the energy within the subsurface region between the virtual source and the virtual source estimation receiver, and the interferometry is based at least in part on the propagation of the energy within the region (e.g., use of Eq. 1 with the energy propagation associated with raypaths 316a and 318a, raypaths 316b and 318b, and raypaths 316c and 318c, in FIGS. 3B, 3C, and 3D, respectively).

In some embodiments, using interferometry to estimate the virtual response further comprises calculating, measuring, and/or deriving a first transit of the energy propagation within the region, wherein the first transit is between the at least one source in the first subzone and the virtual source; calculating, measuring, and/or deriving a second transit of the energy propagation within the region, wherein the second transit is between the at least one source in the first subzone and the virtual source estimation receiver; filtering (or using cross-correlation, deconvolution, or comparing) the first transit with the second transit to identify one or more commonalities of the first and second transits; and deriving a third transit of the energy propagation within the region, wherein: the third transit is between the virtual source and the virtual source estimation receiver, and the third transit is based at least in part on removing the one or more commonalities of the first and second transits (716) (e.g., use of Eq. 1 with the energy propagation associated with raypaths 316a and 318a, raypaths 316b and 318b, and raypaths 316c and 318c, in FIGS. 3B, 3C, and 3D, respectively).

In some embodiments, the virtual response is based at least in part on propagation of the energy in a path within the region that includes: emission from the at least one source, a first reflection or refraction from a first subsurface horizon, a second reflection or refraction from the surface at a location substantially corresponding to the virtual source, a third reflection or refraction from at least a second subsurface horizon, and reception at the virtual source estimation receiver (718) (e.g., in FIGS. 3B, 3C, and 3D, the energy propagation from sources 301-1 and 301-2 resulting in raypaths 316a and 318a, raypaths 316b and 318b, and raypaths 316c and 318c, where the raypaths are generated in part from interaction with features 312 and 314).

In some embodiments, the first subsurface horizon is the second subsurface horizon (720) (e.g., when energy propagates between the surface and just one subsurface feature, such as from source 301-2 to feature 312, then to a part of the surface 310 approximately at virtual source 302, then to feature 312, and back to virtual source estimation receiver 303 in FIGS. 3B-3D). In some scenarios, the first and third reflections (or refractions) are received as a result of interaction with the same subsurface horizon. In some scenarios, the first and third reflections (or refractions) are received as a result of interaction with different subsurface horizons.

In some embodiments, the virtual response is based at least in part on propagation of the energy in a path within the region that includes: emission from the at least one source, a first response from the subsurface that is received at a location substantially corresponding to the virtual source, a second response from the subsurface that is received at the virtual source estimation receiver (722) (e.g., in FIGS. 3B, 3C, and 3D, the energy propagation from sources 301-1 and 301-2 resulting in raypaths 316a and 318a, raypaths 316b and 318b, and raypaths 316c and 318c, where the raypaths are generated in part from interaction with features 312 and 314).

In some embodiments, the virtual response corresponding to at least part of the energy propagation within the region includes one or more factors selected from the group consisting of body waves, reflections, refractions, diving waves, surface waves, interface waves, refracted waves, and guided waves (724).

In some embodiments, the method 700 also includes forming (726) a virtual shot gather based at least in part on the virtual response. In some embodiments, the virtual shot gather corresponds to a border location that is within a first predefined distance of the second subzone (e.g., the virtual shot gather is at the fringe of the second subzone, which is an exclusion zone; for example, in FIG. 6A, additional source lines 610 arrayed as a ring within a chosen distance of exclusion zone 604); and the method 700 further comprises: identifying an actual shot gather in the received data, wherein the actual shot gather corresponds to a location within a second predefined distance of the border location; and overlapping the real shot gather with the virtual shot gather so as to constrain the results of interferometry so that the virtual shot gathers correlate or are a closer match to other portions of the collected data. (728)

Figure 8:
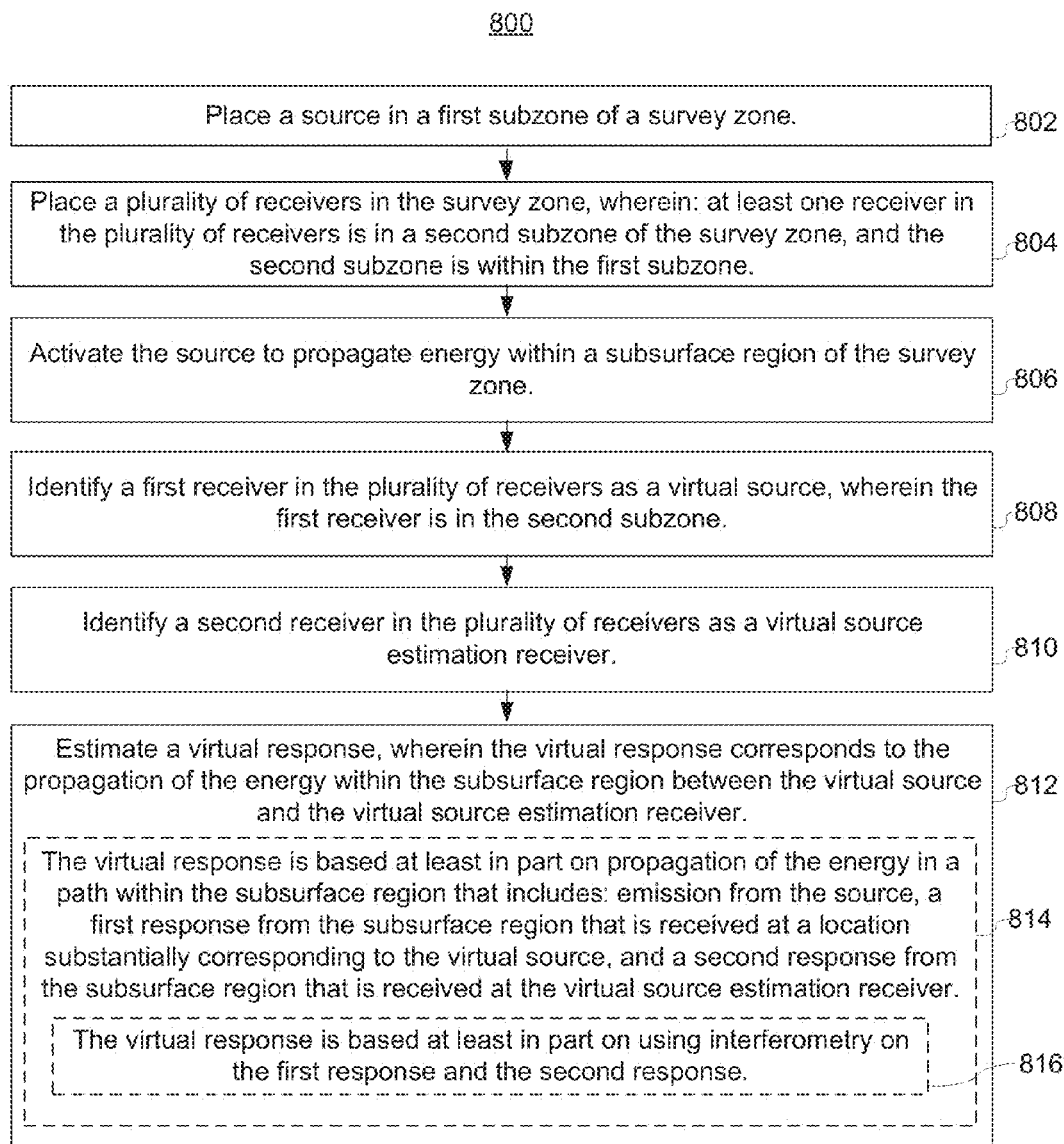

Attention is now directed to FIG. 8, which is a flow diagram illustrating a method 800 in accordance with some embodiments. Some operations in method 800 may be combined and/or the order of some operations may be changed. Further, operations in method 800 may be combined with aspects of method 700 discussed herein, and/or the order of some operations in method 800 may be changed to account for incorporation of aspects of method 700.

The method 800 includes placing (802) a source in a first subzone of a survey zone (e.g., placement of sources 301-1 and 301-2 as illustrated in FIG. 3B).

The method 800 includes placing (804) a plurality of receivers in the survey zone, wherein: at least one receiver in the plurality of receivers is in a second subzone of the survey zone, and the second subzone is within the first subzone (e.g., in FIG. 3A-D, exclusion zone 305, which is a second subzone within the first subzone that includes sources 301-1 and 301-2, includes deployment of receivers at locations 302 and 303, which are designated virtual source 302 and virtual source estimation receiver 303, respectively). In some embodiments, the second subzone is an exclusion zone free of sources.

The method 800 includes activating (806) the source to propagate energy within a subsurface region of the survey zone (e.g., in FIG. 3B, activation of sources 301-1 and 301-2).

The method 800 includes identifying (808) a first receiver in the plurality of receivers as a virtual source, wherein the first receiver is in the second subzone (e.g., in FIG. 3A-D, receiver 302 is designated as virtual source 302).

The method 800 includes identifying (810) a second receiver in the plurality of receivers as a virtual source estimation receiver (e.g., in FIG. 3A-D, receiver 303 is designated as virtual source estimation receiver 303).

The method 800 includes estimating (812) a virtual response, wherein the virtual response corresponds to the propagation of the energy within the subsurface region between the virtual source and the virtual source estimation receiver (e.g., in FIG. 3D, estimating raypaths 316c and 318c based on propagation of the energy from sources 301-1 and 301-2 through the survey zone).

In some embodiments, the virtual response is based at least in part on propagation of the energy in a path within the subsurface region that includes: emission from the source, a first response from the subsurface region that is received at a location substantially corresponding to the virtual source, and a second response from the subsurface region that is received at the virtual source estimation receiver (814) (e.g., in FIGS. 3A-3D, estimating raypaths 316c and 318c based on propagation of the energy from sources 301-1 and 301-2 through the survey zone including a) responses from the subsurface associated with reception at virtual source 302 of raypaths 316a and 318a and b) responses from the subsurface associated with reception at virtual source estimation receiver 303 of raypaths 316b and 318b).

In some embodiments, estimating the virtual response is based at least in part on using interferometry on the first response and the second response (816) (e.g., in FIGS. 3B-3D, using Eq. 1 with raypaths 316a, 318a, 316b and 318b). In some embodiments, the virtual response corresponds to at least part of the energy propagation within the region, and includes one or more factors selected from the group consisting of ground roll waves, body waves, reflections, refractions, diving waves, surface waves and interface waves.

In some embodiments, one can overlap real shot gathers with virtual shot gathers at the fringes of an exclusion zone so as to constrain the results of seismic interferometry such that the virtual shots are a closer match to the rest of the collected survey data. For example, when estimating short offset marine data using seismic interferometry, one can use neighboring real shots and a matching filter to improve the virtual source estimates. This process can help eliminate artifacts present in the virtual shot records and differences in the power spectrum between the real shots and the virtual shots.

In multidimensional deconvolution (MDD), interferometry is formulated as an inverse problem where many virtual sources are estimated in one computation. Those with skill in the art will appreciate that this technique may be successfully applied with the methods and techniques disclosed herein. Further, in some embodiments, real shot records can also be used as prior information where they overlap with virtual shot locations. Thus, the virtual shot outputs can be merged with the real shots by incorporating this prior information into the inverse problem. One consideration with using MDD, however, is that the two interferometry inputs cannot be the same, and as such, some form of appropriate wavefield separation would typically be performed during pre-processing. For a 1D deconvolution case, using a predictive deconvolution operation to separate ambient noise records into two different parts can be beneficial, and a similar process can be applied for active source scenarios.

Moreover, those with skill in the art will recognize that adjusting the source and/or receiver geometries around an exclusion zone can facilitate the application of the "virtual source" method. For example, overlapping real and virtual sources may be used to merge the virtual part of the data set with the real part of the data set.

Furthermore, the techniques of virtual source and/or virtual receivers may be used in situations where, rather than physical access limitations, data quality is at issue for a given source or a receiver. For example, in some survey locations, local ground conditions may cause a source-generated signal to be weak and noisy, but the receiver(s) in that general vicinity may be less affected by local ground conditions. In such an instance, use of virtual source and/or virtual receivers may be employed to improve collected survey data.

Additionally, virtual source and/or virtual receiver techniques may be used to achieve productivity gains by replacing source locations with receiver locations. This can create considerable cost savings in dynamite surveys, where drilling is expensive.

Moreover, the virtual source and/or virtual receiver techniques disclosed herein can be used for seabed and towed marine data, and it can be applied to 3D and 2D seismic data.

While many examples of techniques disclosed herein are directed to virtual sources, as noted above, virtual receivers may also be used with the techniques and methods disclosed herein. Attention is now directed to example, non-limiting embodiments involving use of virtual receivers.

Note that, as those with skill in the art will appreciate, the various techniques disclosed herein for virtual receivers may, as appropriate for performing a survey and/or processing data collected during a survey, be: employed as a method of processing collected survey data; employed in and/or with a survey system in accordance with one or more of the embodiments in FIGS. 3-6; evaluated in a computing system such as the example computing system 100 in FIG. 1; stored in a computer readable storage medium, and/or an information processing apparatus for use in a computing system.

In some embodiments, a method is provided that includes: receiving data collected from a zone that corresponds to a region having a surface and a subsurface region, wherein: the zone includes a plurality of sources, the zone includes a first subzone having one or more receivers, the zone includes a second subzone that is disposed within the first subzone, and the received data includes data corresponding to an activation of at least one source, wherein the source activation propagates an energy within the region; defining as a virtual receiver a first source selected from the plurality of sources, wherein the virtual receiver is disposed within the second subzone; defining as a virtual receiver estimation source a second source selected from the plurality of sources; using interferometry to estimate a virtual response, wherein: the virtual response corresponds to the propagation of the energy within the subsurface region between the virtual receiver and the virtual receiver estimation source, and the interferometry is based at least in part on the propagation of the energy within the region.

In some embodiments, the virtual receiver estimation source is disposed within the second subzone.

In some embodiments, the virtual receiver estimation source is disposed outside of the second subzone.

In some embodiments, using interferometry to estimate the virtual response further comprises: measuring a first transit of the energy propagation within the region, wherein the first transit is between a receiver in the first subzone and the virtual receiver; measuring a second transit of the energy propagation within the region, wherein the second transit is between the receiver in the first subzone and the virtual receiver estimation source; filtering the first transit with the second transit to identify one or more commonalities of the first and second transits; and deriving a third transit of the energy propagation within the region, wherein: the third transit is between the virtual receiver and the virtual receiver estimation source, and the third transit is based at least in part on removing the one or more commonalities of the first and second transits.

In some embodiments, the energy propagation within the region includes one or more reflections of the energy between at least the surface and one or more subsurface horizons.

In some embodiments, the virtual response is based at least in part on propagation of the energy in a path within the region that includes: emission from the at least one source, a first reflection from a first subsurface horizon, a second reflection from the surface at a location substantially corresponding to the virtual receiver, a third reflection from at least a second subsurface horizon, and reception at the virtual receiver estimation source.

In some embodiments, the first subsurface horizon is the second subsurface horizon.

In some embodiments, the virtual response is based at least in part on propagation of the energy in a path within the region that includes: emission from the at least one source, a first response from the subsurface that is received at a location substantially corresponding to the virtual receiver, and a second response from the subsurface that is received at the virtual receiver estimation source.

In some embodiments, a survey system is provided for use at a survey zone, which includes a region having a surface and a subsurface region, a first subzone within the survey zone, and a second subzone that is disposed within the first subzone: one or more receivers disposed in the first subzone, a plurality of sources disposed in the survey zone, wherein: a first source in the plurality of sources is adapted to be designated a virtual receiver, wherein the first source is disposed in the second subzone; and a second source in the plurality of sources is adapted to be designated a virtual receiver estimation source.

In some embodiments of the survey system, the one or more receivers are disposed on the surface of the region.

In some embodiments of the survey system, the plurality of sources is disposed on the surface of the region.

In some embodiments of the survey system, the sources and receivers are configured to generate and receive seismic energy, respectively.

In some embodiments of the survey system, the second subzone is an exclusion zone.

In some embodiments of the survey system, the survey system is adapted to be reconfigurable during a survey operation by deploying another source or receiver within the survey zone.

In some embodiments of the survey system, the virtual receiver estimation source is disposed in the second subzone.

In some embodiments, a method of carrying out a survey is provided, and includes placing a receiver in a first subzone of a survey zone; placing a plurality of sources in the survey zone, wherein: at least one source in the plurality of sources is in a second subzone of the survey zone, and the second subzone is within the first subzone; activating at least one source to propagate energy within a subsurface region of the survey zone; identifying a first source in the plurality of sources as a virtual receiver, wherein the first source is in the second subzone; identifying a second source in the plurality of sources as a virtual receiver estimation source; and estimating a virtual response, wherein the virtual response corresponds to the propagation of the energy within the subsurface region between the virtual receiver and the virtual receiver estimation source.

In some embodiments, the virtual response is based at least in part on propagation of the energy in a path within the subsurface region that includes: emission from the source, a first response from the subsurface region that is received at a location substantially corresponding to the virtual receiver, and a second response from the subsurface region that is received at the virtual receiver estimation source.

In some embodiments, estimating the virtual response is based at least in part on using interferometry on the first response and the second response.

In some embodiments, a computing system is provided, and comprises at least one processor; at least one memory; and one or more programs stored in the at least one memory, wherein the one or more programs are configured to be executed by the one or more processors, the one or more programs including instructions for: estimating a virtual response that corresponds to energy propagated within a subsurface region between a virtual receiver and a virtual receiver estimation source, wherein: the subsurface region corresponds to a survey zone including: a plurality of sources deployed within the survey zone, a first subzone having at least one actual receiver, a second subzone within the first subzone; the virtual receiver is a first source disposed in the second subzone; and the virtual receiver estimation source is a second source.

In some embodiments, estimating the virtual response is based at least in part on using interferometry on a response from the subsurface region received at the virtual receiver estimation source.

Furthermore, the various techniques disclosed herein for virtual receivers may be employed in combination with the various embodiments associated with virtual sources, such that a combination of one or more virtual sources and one or more virtual receivers are used in a survey zone with a plurality of actual sources and receivers.

In some embodiments, a survey zone may have a plurality of subzones wherein a first subzone may include virtual sources and a second subzone may include virtual receivers, wherein the first and second subzones do not overlap.

While certain implementations have been disclosed in the context of seismic data collection and processing, those with skill in the art will recognize that the disclosed methods can be applied in many fields and contexts, including any survey type employing a plurality of sources to emit energy and receivers that collect received data representing the propagation of that energy throughout a subsurface region, including but not limited to, electromagnetic surveys, gravity surveys, etc. The techniques disclosed herein may also apply to dataset processing for imaging collected data that represents any three-dimensional space, e.g., medical imaging techniques such as tomography, ultrasound, MRI and the like, SONAR and LIDAR imaging techniques and the like.

The steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Various references that provide further information have been referred to above, and each is incorporated by reference.

Wang Y., Luo Y., Schuster G. T., 2009, Interferometric interpolation of missing data, Geophysics, Vol 74, No 3, p. 137-145.

Forghani F., Snieder R., 2010, Underestimation of body waves and feasibility of surface-wave reconstruction by seismic interferometry, The Leading Edge, July, p. 790-794.

Hanafy S. N., Cao W., and Schuster G. T, 2009, Interferometric interpolation of 3D SSP data, SEG Expanded Abstracts 28, 3138-3141.

Cao W., Interferometric interpolation of 3D OBS data, 2009, SEG Expanded Abstracts 28, 3148-3151.

Bakulin A., and Calvert R., 2006, The Virtual Source method: theory and case study: Geophysics, 71, SI139-SI150.

Wapenaar K., 2006, Green's function retrieval by cross-correlation in case of one-sided illumination: Geophysical Research Letters, Vol. 33, L19304-1-L19304-6.

Vasconcelos, I. and R. Snieder, 2008, Interferometry by deconvolution: Part 2—Theory for elastic waves and application to drill-bit seismic imaging, Geophysics, 73, S129-S141, 2008

Edme, P. And D. Halliday, 2011, Extracting reflectivity response from single sensor ambient noise, Expanded Abstracts, SEG $81^{st}$ Annual Meeting, accepted.

Wapenaar, K., J. van der Neut, E. Ruigrok, D. Draganov, J. Hunziker, E. Slob, J. Thorbecke and R. Snieder, 2011, Seismic interferometry by crosscorrelation and by mutidimensional deconvolution: a systematic comparison, Geophys. J. Int., 185, 1335-1364.

What is claimed is:

1. A survey system, comprising:
   a plurality of actual sources activatable to emit seismic energy, the plurality of actual sources disposed in a first subzone within a survey zone that includes a surface and a subsurface region underneath the surface,
   a plurality of receivers disposed on the surface in the survey zone, wherein:
   a first receiver of the plurality of receivers is configured to be designated a virtual source, wherein the first receiver is disposed in a second subzone within the first subzone, the second subzone being free of actual sources; and
   a second receiver of the plurality of receivers is configured to be designated a virtual source estimation receiver, the second receiver disposed in the second subzone,
   wherein the plurality of actual sources on the surface are arranged to surround the first and second receivers in the second subzone along the surface.

2. The survey system of claim 1, wherein the plurality of receivers are configured to receive seismic energy.

3. The survey system of claim 1, wherein the second subzone is an exclusion zone.

4. A method, comprising:
   placing a plurality of actual sources on an earth surface in a first subzone of a survey zone, the plurality of actual sources activatable to emit seismic energy;

placing a plurality of receivers on the earth surface in the survey zone, wherein:
  first and second receivers of the plurality of receivers are in a second subzone of the survey zone, the second subzone free of actual sources,
  the second subzone is within the first subzone, and the plurality of actual sources surround the first and second receivers in the second subzone along the earth surface;
activating at least one actual source of the plurality of actual sources to cause the at least one actual source to emit energy within a subsurface region of the survey zone;
identifying the first receiver of the plurality of receivers as a virtual source, wherein the first receiver is in the second subzone;
identifying the second receiver of the plurality of receivers as a virtual source estimation receiver; and
estimating, by a computer system, a virtual response, wherein the virtual response corresponds to a propagation of the energy within the subsurface region between the virtual source and the virtual source estimation receiver, wherein the estimating comprises removing a propagation of the energy within the subsurface region between the at least one actual source and the virtual source so that the propagation of the energy within the subsurface region between the at least one actual source and the virtual source is not considered in estimating the virtual response.

5. The method of claim 4, wherein the propagation of the energy between the virtual source and the virtual source estimation receiver includes:
  a reflection from the earth surface at a location corresponding to the virtual source, and
  a reflection from a subsurface horizon in the subsurface region that is received at the virtual source estimation receiver.

6. The method of claim 4, wherein estimating the virtual response is based at least in part on using interferometry on a response from the subsurface region received at the virtual source estimation receiver.

7. The method of claim 4, wherein the plurality of actual sources are arranged to surround at least four sides of the second subzone.

8. The method of claim 4, further comprising processing, by the computer system, data including the virtual response to provide a representation of the subsurface region.

* * * * *